Patented July 30, 1940

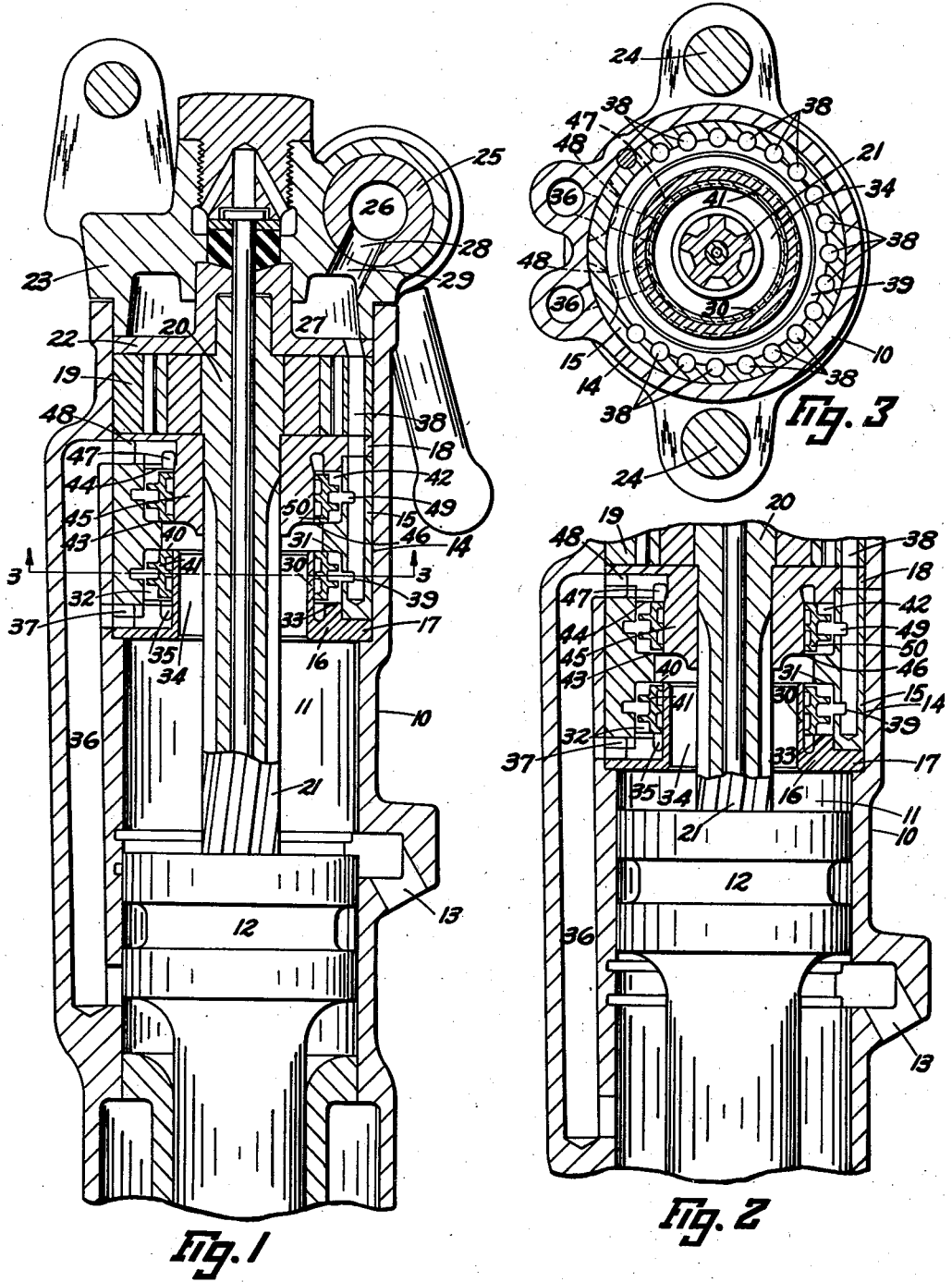

2,209,491

UNITED STATES PATENT OFFICE 2,209,491

VALVE FOR ROCK DRILLS

William A. Smith, Jr., Cleveland, Ohio, assignor to The Cleveland Rock Drill Company, Cleveland, Ohio, a corporation of Ohio Application June 19, 1939, Serial No. 279,786

6 Claims. (Cl. 121—19)

This invention relates broadly to fluid actuated rock drills, but more particularly to a valvular mechanism therefor.

One object of this invention is to produce a rock drill with an efficient valve mechanism of simple construction and readily responsive to the action of the motive fluid.

Another object of this invention is to produce a rock drill with valves capable of rapid and efficient disposition of the motive fluid resulting in the fast reciprocation of the piston.

Other objects and advantages more or less ancillary to the foregoing reside in the specific construction and aggroupment of the elements peculiar to this structure, as will become apparent from a more complete examination of this specification.

In the drawing:

Fig. 1 is a longitudinal sectional view of a portion of a rock drill illustrating the invention.

Fig. 2 is a view similar to Fig. 1 illustrating movable parts in another position.

Fig. 3 is a cross sectional view taken in a plane indicated by line 3—3 in Fig. 1.

Referring to the drawing, 10 represents a cylinder formed with a piston chamber 11 having a piston 12 reciprocable therein for delivering impacts to the drill steel in the usual manner. Intermediate its ends, the cylinder 10 is provided with the usual exhaust port 13.

The rear end of the cylinder 10 is formed with a counterbore 14 accommodating a valvular mechanism including a valve casing 15 having mounted in the lower end thereof a valve cap 16 formed with an external annular flange 17 resting on the bottom of the counterbore 14, and a valve bushing 18.

In the upper end of the counterbore 14 is mounted the usual rotation mechanism including a ratchet ring 19 resting on the valve bushing 18, within which ring is rotatably mounted the head 20 of a rifle bar 21 extending through the valve casing 15 into the piston 12 for operative engagement with a corresponding nut (not shown). The head 20 of the rifle bar is maintained within the ring 19 by a bearing plate 22 clamped on the ring by a back head 23 which is rigidly secured to the cylinder 10 by two side bolts 24.

Within the back head 23, there is a rotatable throttle valve 25 formed with a central bore 26 having motive fluid admitted therein from any suitable source, which central bore is capable of communication with a large recess 27 provided back of the plate 22 through a throttle valve port 28 and a back head port 29.

Referring now more particularly to the invention, the valve cap 16 is provided with a tubular portion 30 extending upwardly therefrom into the casing 15 to end level with an annular valve seat 31 formed by the bottom of a counterbore or valve chamber 32 provided in the lower end of the casing 15. This valve seat is opposed to a similar seat 33 provided on the valve casing 16 adjacent the lower end of the casing 15. The interior of the tubular portion 30 is spaced from the stem 21 to form an annular inlet passage 34 opening into the rear end of the piston chamber 11. Internally of the valve seat 33, the bushing 15 is provided with an annular recess 35 communicating with front inlet passages 36 through radial ports 37. Leading from the enlarged recess 27 behind the bearing plate 22 there is a plurality of motive fluid supplying passages 38 opening into the valve chamber 32 of the casing 15 via an annular groove 39, while the chamber 32 is capable of communication with the rear inlet passage 34 through an annular clearance or passageway 40 provided between the tubular portion 30 and the casing 15. In the valve chamber 32 is reciprocably mounted a sleeve-like valve 41 slidable on the tubular portion 30 and capable of end engagement with the valve seats 31 and 33.

The upper end of the casing 15 is also counterbored to form a valve chamber 42, the bottom 43 of which constitutes a valve seat opposed to a similar valve seat 44 formed on the valve bushing, which bushing has a tubular portion 45 extending downwardly into the casing 15 in spaced relation therewith to provide an annular passageway 46 opening into the rear inlet passage 34. Internally of the valve seat 44, the bushing is provided with an annular recess 47 opening into the inlet passage 36 through radial ports 48, while the valve chamber 42 is in constant communication with the motive fluid supplying passages 38 through an annular groove 49. Reciprocably mounted within the chamber 42, there is a sleeve-like valve 50 slidable on the tubular portion 45 of the bushing 18 and capable of end engagement with the valve seats 43 and 44.

In the operation of the mechanism, if the parts are positioned as shown in Fig. 1, motive fluid admitted into the throttle valve bore 26 will flow into the recess 27 through the ports 28 and 29 for supplying motive fluid to the passages 38, from where the fluid will flow into the valve chambers 32 and 42 via the grooves 39 and 49 respectively. With the valves positioned as shown in Fig. 1, from the chamber 32 the motive fluid will flow over the valve seat 33 into the groove 35 and therefrom into the passages 36 via the radial ports 37. During the flow of the motive fluid over the valve seat 33, the fluid will act on the front end of the valve 41 for maintaining the valve in end engagement with the valve seat 31. With reference to the motive fluid in the valve chamber 42, it will flow therefrom into the annular recess 47 and into the front inlet passages 36 via the radial ports 48. In this instance, the motive fluid passing over the valve seat 44 will also act on the adjacent end of the valve 50 for maintaining the valve in engagement with the valve seat 43. The motive fluid thus admitted into the front inlet passages 36 will flow into the front end of the piston chamber 11 to act on the piston 12 for driving it rearwardly. During its rearward stroke the piston will first cover the exhaust port 13 thereby subjecting the atmospheric air within the rear end of the piston chamber 11 to compression resulting in pressure being exerted on the inner or adjacent ends of the valves 41 and 50 tending to shift them in the position shown in Fig. 2. As the piston reaches the end of its rearward stroke it will uncover the exhaust port 13, thereby enabling the motive fluid from the front end of the piston chamber 11 to exhaust through the port 13 and causing a consequential drop of pressure of the motive fluid to take place in the valve chambers 32 and 42, resulting in a drop of pressure on the remote ends of the valves causing them to shift to the position shown in Fig. 2.

In this new position of the valves, motive fluid from the valve chamber 32 will flow into the rear inlet passage 34 via the annular passage 40, thereby exerting pressure on the end surface of the valve 41 adjacent the valve seat 31 for maintaining the valve in end engagement with the valve seat 33. Simultaneously the motive fluid in the valve chamber 42 will flow therefrom, via the annular passage 46, into the rear inlet passage 34 and will also exert pressure on the end of the valve 50 adjacent the valve seat 43 for maintaining the valve in end engagement with the valve seat 44. The pressure fluid now flowing through the rear inlet passage 34 will be admitted into the rear end of the piston chamber 11 for driving the piston 12 downwardly. During its downward stroke, the piston will first cover the exhaust port 13 and thereafter subject the atmospheric air within the front end of the piston chamber 11 to compression, thus resulting in pressure being exerted on the remote ends of the valves 41 and 50 tending to shift the valves into the position shown in Fig. 1. As the piston reaches the end of its forward stroke, it will uncover the exhaust port 13, allowing the motive fluid within the rear end of the piston chamber 11 to exhaust through the port 13 and thereby causing a consequential drop of pressure of the motive fluid on the adjacent ends of the valves 41 and 51 resulting in the valves shifting into the position shown in Fig. 1.

From the foregoing explanation, it will be understood that the present construction offers a double supply of motive fluid into the front and rear ends of the piston chamber 11. The front supply taking place when the valves 41 and 50 are maintained in spaced relation with the valve seats 33 and 44 respectively and the rear supply taking place when the valves are maintained in spaced relation with the valve seats 31 and 43, thereby enabling a very short travel of the valve without restricting the admission of the motive fluid into the piston chamber 11.

Although the foregoing description is necessarily of a detailed character, in order to completely set forth the invention, it is to be understood that the specific terminology is not intended to be restrictive or confining and it is to be further understood that various rearrangements of parts and modifications of structural detail may be resorted to without departing from the scope or spirit of the invention as herein claimed.

I claim:

1. In a fluid actuated rock drill, a cylinder having a piston chamber and a piston reciprocable therein, an exhaust port for the piston chamber, a valve casing, a pair of coaxially disposed reciprocatory valves longitudinally spaced within said casing, means for admitting motive fluid into said piston chamber including an inlet passage leading from one end of one of said valves to the rear end of said chamber through the other of said valves, a motive fluid supplying passageway leading to said valves, and valve seats within said casing engageable by said valves for controlling communication between said passage and passageway.

2. In a fluid actuated rock drill, a cylinder having a piston chamber and a piston reciprocable therein, an exhaust port for the piston chamber, a valve casing, a pair of reciprocatory valves coaxially and longitudinally spaced within said casing, means for admitting motive fluid into said piston chamber including a front inlet passage leading from the remote ends of said valves to the front end of the chamber and a rear inlet passage leading from the adjacent ends of said valves to the rear end of said chamber, a motive fluid supplying passageway capable of communication with said inlet passages, and valve seats within said casing engageable by said valves for controlling communication between said passages and passageway.

3. In a fluid actuated rock drill, a cylinder having a piston reciprocable therein, an exhaust port for said cylinder, a valve casing formed with a pair of coaxially disposed longitudinally spaced valve chambers, means for supplying motive fluid to said chambers, front and rear inlet passages leading from each chamber to the ends of said cylinder, a sleeve-like valve reciprocable within each of said chambers, opposed valve seats within each valve chamber engageable by said valves for controlling communication of said chambers with said front and rear inlet passages, the end surfaces of said valves forming valve actuating areas subjected to pressure conditions within said cylinder for shifting said valves into operative engagement with one or the other of their respective valve seats, and holding areas for said valves also formed by said end surfaces subjected to motive fluid flowing into said passages for momentarily holding said valve in said operative engagement.

4. In a fluid actuated rock drill, a cylinder having a piston reciprocable therein, an exhaust port for said cylinder, a valve casing formed with a pair of coaxially disposed longitudinally spaced valve chambers, means for supplying motive fluid to said chambers, a front and a rear inlet passage both leading from said chambers to the ends of said cylinder, a sleeve-like valve reciprocable within each of said chambers, the adjacent ends of said chambers forming valve seats engageable by said valves for controlling communication between said chambers and said rear inlet ports while the remote ends of said chambers form valve seats engageable by said valves for controlling communication between said chambers and said front inlet ports, and shifting areas on said valves subjected to pressure conditions within said cylinder for shifting said valves into operative engagement with said valve seats.

5. In a fluid actuated rock drill, a cylinder having a piston reciprocable therein, an exhaust port for said cylinder, a valve casing formed with a pair of coaxially disposed longitudinally spaced valve chambers, a front and a rear inlet passage both leading from said chambers to the ends of said cylinder, the remote ends and the adjacent ends of said chambers forming pairs of valve seats capable of communication with said front and rear inlet passages respectively, means for admitting motive fluid to said valve seats, means for controlling communication of said valve seats with said inlet passages including a pair of reciprocatory sleeve-like valves one within each of said chambers, and shifting areas on said valves alternatively subjected to pressure conditions within said cylinder for effecting concurrent engagement of said valves alternatively with the inner and remote seats of their respective chamber.

6. In a fluid actuated rock drill, a cylinder having a piston reciprocable therein, an exhaust port for said cylinder, a valve casing formed with a pair of coaxially longitudinally spaced valve chambers, a pair of longitudinally spaced valve seats within each of said chambers, a sleeve-like valve for each of said chambers reciprocable between said seats, passages for admitting motive fluid into said chambers and therefrom into the ends of said cylinder, said valves being capable of concurrent end engagement with the inner adjacent seats and subsequently with the remote seats within said chambers for controlling admission of the motive fluid into the cylinder, and opposed actuating areas on each of said valves alternatively subjected to pressure conditions within said cylinder for actuating said valves.

WILLIAM A. SMITH, Jr.